United States Patent
Aridome

(10) Patent No.: US 7,304,404 B2
(45) Date of Patent: Dec. 4, 2007

(54) FAN SYSTEM FOR VEHICLES AND METHOD FOR CONTROLLING FAN IN VEHICLES

(75) Inventor: Koji Aridome, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 284 days.

(21) Appl. No.: 10/900,422

(22) Filed: Jul. 28, 2004

(65) Prior Publication Data

US 2005/0029870 A1 Feb. 10, 2005

(30) Foreign Application Priority Data

Aug. 7, 2003 (JP) .............................. 2003-288822

(51) Int. Cl.
*H01H 35/00* (2006.01)
(52) U.S. Cl. ..................... 307/116; 307/10.1
(58) Field of Classification Search ................. 307/9.1; 429/22

See application file for complete search history.

(56) References Cited

U.S. PATENT DOCUMENTS

| 4,425,766 | A | * | 1/1984 | Claypole | ............... 62/133 |
| 5,018,484 | A | * | 5/1991 | Naitoh | ............... 123/41.12 |
| 6,762,590 | B2 | * | 7/2004 | Yudahira | ............... 320/135 |
| 7,019,488 | B2 | * | 3/2006 | Nakao | ............... 320/104 |
| 2003/0157384 | A1 | * | 8/2003 | Kondo | ............... 429/22 |
| 2005/0168180 | A1 | * | 8/2005 | Minekawa et al. | ........ 318/268 |

FOREIGN PATENT DOCUMENTS

JP   A 2000-100481   4/2000

* cited by examiner

*Primary Examiner*—Michael Sherry
*Assistant Examiner*—Adi Amrany
(74) *Attorney, Agent, or Firm*—Kenyon & Kenyon LLP

(57) ABSTRACT

A fan system is provided which keeps a record of the electric connection between a battery ECU and an accessory battery and starts a fan if it is determined based on the record that the electric connection between the battery ECU and the accessory battery was just in an unconnected state.

14 Claims, 7 Drawing Sheets

FIG.3

| FAN COMMAND VALUE | 0 | 1 | 2 | 3 | 4 |
|---|---|---|---|---|---|
| FAN VOLTAGE | off | LOW | MIDDLE | HIGH | HIGH |

SERVICE PLUG: PLUGGED

SERVICE PLUG: UNPLUGGED

FAN SYSTEM FOR VEHICLES AND METHOD FOR CONTROLLING FAN IN VEHICLES

INCORPORATION BY REFERENCE

The disclosure of Japanese Patent Application No. 2003-288822 filed on Aug. 7, 2003 including the specification, drawings and abstract is incorporated herein by reference in its entirety.

BACKGROUND OF THE INVENTION

1. Field of the Invention

The present invention relates to a fan system for vehicles and a method for controlling a fan in vehicles.

2. Description of the Related Art

A wide variety of motor-driven vehicles (e.g., electric vehicles, hybrid motor vehicles, fuel-cell powered vehicles) is known and each of such vehicles usually includes a battery for powering the driving system of the vehicle and a fan system for cooling the battery since its capacity (performance) may otherwise decrease with increase in the temperature of the battery while charged and discharged repeatedly.

Japanese Laid-opened Patent Application No. 2000-100481 discloses a battery assembly for electric vehicles which enables the efficient use of space while ensuring a good cooling efficiency. This battery assembly has a battery case in which battery chambers are formed, battery modules each displaced in the battery chamber, and fans mounted on the lid of the battery case. This battery assembly is fixed to the bottom side of the chassis frame of the vehicle.

According to this art, each battery module is cooled by each fan, which provides a good efficiency in cooling the module and prevents variations in temperature among the battery modules.

However, once such a battery assy has been mounted to the bottom side of the chassis frame of the vehicle, for example, during an assembly or maintenance of the vehicle, it is impossible to visually check the electric connection of each fan, and therefore a worker can not check if the fan is correctly connected.

SUMMARY OF THE INVENTION

In view of the above problem, the invention has been made to provide a fan system for a vehicle and a method for controlling a fan provided in a vehicle, each enabling an easy check on the electric connection of the fan and thus contributing to prevention of errors in such connections. Also, improving the work safety for workers is one of the objects of the invention.

A first aspect of the invention relates to a fan system including a fan and a fan controller. The fan controller is adapted to keep a record of a state of a predetermined electric connection in the fan system, and start the fan in response to a predetermined condition regarding the state of the predetermined electric connection being satisfied.

According to this fan system, the fan controller keeps a record of a specific electric connection, and starts the fan when the predetermined condition regarding the same connection has been satisfied. For example, the predetermined condition may be such that the record of the specific electric connection indicates that the same connection was just in an unconnected state. In this case, the fan starts running when the predetermined electric connection in the fan system has been shifted from an unconnected state to a connected state during an assembly or maintenance of the vehicle. If the fan runs normally at this time, a worker can ascertain that there is no defect in electric connections in the fan system. If not, conversely, he or she can notice some defect in those. Consequently, even after the electric connection of the fan can no longer be checked visually after installed to the vehicle, the worker is still able to check the electric connections of the fan system easily which contributes to prevention of connection errors.

A second aspect of the invention relates to a fan system for a vehicle, including a fan and a fan controller. The fan controller is adapted to detect a shift in a state of a predetermined electric connection in the fan system from an unconnected state to a connected state, and start the fan in response to a predetermined condition regarding the state of the predetermined electric connection being satisfied.

According to this fan system, the fan controller detects a shift in the state of the predetermined electric connection, and starts the fan when the predetermined condition regarding the same connection has been satisfied. For example, the predetermined condition may be such that the predetermined electric connection in the fan system shifts from an unconnected state to a connected state. In this case, for example, the fan starts running when the predetermined electric connection has been shifted from an unconnected state to a connected state during an assembly or maintenance of the vehicle. If the fan runs normally at this time, a worker can ascertain that there is no defect in electric connections in the fan system. If not, conversely, he or she can notice some defect in those. Consequently, even after the electric connection of the fan can no longer be checked visually after installed to the vehicle, the worker is still able to check the electric connections of the fan system easily which contributes to prevention of connection errors.

A third aspect of the invention relates to a fan system for a vehicle, including a fan and fan controlling means. The fan controlling means keeps a record of a state of a predetermined electric connection in the fan system, and starts the fan in response to a predetermined condition regarding the state of the predetermined electric connection being satisfied.

A fourth aspect of the invention relates to a fan system for a vehicle, including a fan and fan controlling means. The fan controlling means detects a shift in a state of a predetermined electric connection in the fan system from an unconnected state to a connected state, and starts the fan in response to a predetermined condition regarding the state of the predetermined electric connection being satisfied.

A fifth aspect of the invention relates to a method for controlling a fan system for a vehicle including a fan. This method keeps a record of a state of a predetermined electric connection in the fan system, and starts the fan in response to a predetermined condition regarding the state of the predetermined electric connection being satisfied.

A sixth aspect of the invention relates to a method for controlling a fan system for a vehicle including a fan. This method detects a shift in a state of a predetermined electric connection in the fan system from an unconnected state to a connected state, and starts the fan in response to a predetermined condition regarding the state of the predetermined electric connection being satisfied.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein:

FIG. 3 is a command table stored in a memory;

DETAILED DESCRIPTION OF THE PREFERRED EMBODIMENTS

Figure 1:
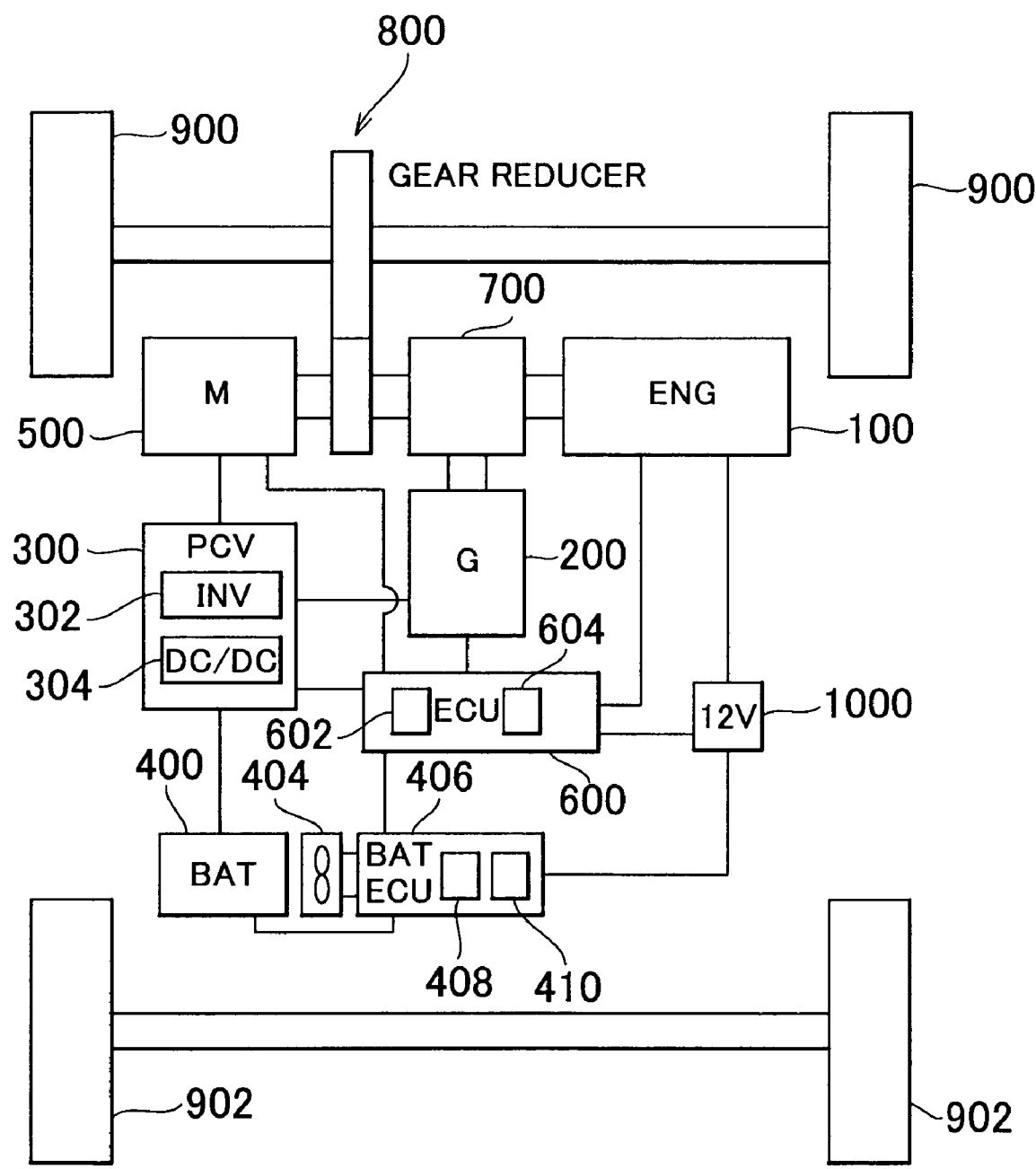
FIG. 1 is a view schematically showing the configuration of a hybrid vehicle incorporating a fan system according to an exemplary embodiment of the present invention.

Hereinafter, exemplary embodiments of the present invention will be described with reference to the accompanying drawings. In the following, like reference numerals will be used for like elements in each embodiment FIG. 1 schematically shows the configuration of a hybrid vehicle incorporating a fan system according to a first exemplary embodiment of the invention. Referring to FIG. 1, the hybrid vehicle includes an engine 100, a generator 200, a power control unit 300, a battery 400, a fan 404, a battery ECU (Electronic Control Unit) 406, a motor 500, a hybrid ECU 600, and an accessory battery 1000.

The driving force from the engine 100 is divided into two paths at a driving force distribution mechanism 700. One path leads to drive wheels 900 to drive them via a gear reducer 800 while another leads to the generator 200 to drive it for power generation. The driving force of the engine 100 is also used to drive a starter generator, not shown, to generate power, and the power thus generated is stored in the accessory battery 1000.

In the meantime, the power generated by the generator 200 is used in accordance with the running state of the vehicle and the SOC (State Of Charge) of the battery 400. For example, if the vehicle is running in a normal running mode or accelerating sharply, the power of the generator 200 is used to drive the motor 500. Meanwhile, if the charge level of the battery 400 is lower than a reference level, the power generated by the generator 200 is partially or entirely used to charge the battery 400 after current conversion from AC to DC at an inverter 302 and voltage regulation at a converter 304.

The battery 400 contains a plurality of battery modules connected in series. Each battery module consists of a plurality of battery cells integrated with each other. The battery 400 is cooled by the air introduced by the fan 404. The battery 400 and the fan 404 are connected to the battery ECU 406. The battery ECU 406 controls the operation of the fan 404 and monitors the temperature and the SOC of the battery 400 while sending the obtained information to the hybrid ECU 600. In operation, the battery ECU 406 starts the fan 404 in response to the temperature of the battery 400 exceeding a reference temperature based on a program and a map stored in a memory 408. The battery ECU 406 is connected to the terminals of the accessory battery 1000 and is supplied with power therefrom. A counter 410 keeps counting time as long as the battery ECU 406 is electrically connected to the battery 1000, and is reset to 0 in response to the electric connection between the battery ECU 406 and the accessory battery 1000 being placed in an unconnected state, e.g., in response to the battery ECU 406 being disconnected from the terminals of the accessory battery 1000. Thus, the battery ECU 406 refers to the reading of the counter 410 and determines whether the electric connection between the ECU battery 406 and the accessory battery 1000 was just in an unconnected state, i.e., whether the state of the electric connection between the battery ECU 406 and the accessory battery 1000 has shifted from an unconnected state to a connected state. If so, the battery ECU 406 starts the fan 404 (S50).

The motor 500 runs on at least one of the power from the battery 400 or the power generated by the generator 200. The driving force of the motor 500 is transmitted to the wheels 900 via the gear reducer 800. Thus, the motor 500 serves to drive the vehicle together with the engine 100 or alone.

The vehicle, which is a hybrid vehicle, applies a regenerative brake where the motor 500 generates power by being driven by the wheels 900 via the gear reducer 800. In this way, the motor 500 also acts as a regenerative brake device for converting brake energy into electric power. The power generated by the motor 500 is stored in the battery 400 via the inverter 302.

The hybrid ECU 600 includes a CPU (Central Processing Unit) 602 and the memory 604. The CPU 602 is adapted to control various devices provided in the vehicle in accordance with programs and maps stored in the memory 604 through computations using values indicative of the running state of the vehicle, the depression of the brake pedal, the shift position, the SOC of the battery 400, and so on.

Figure 2:
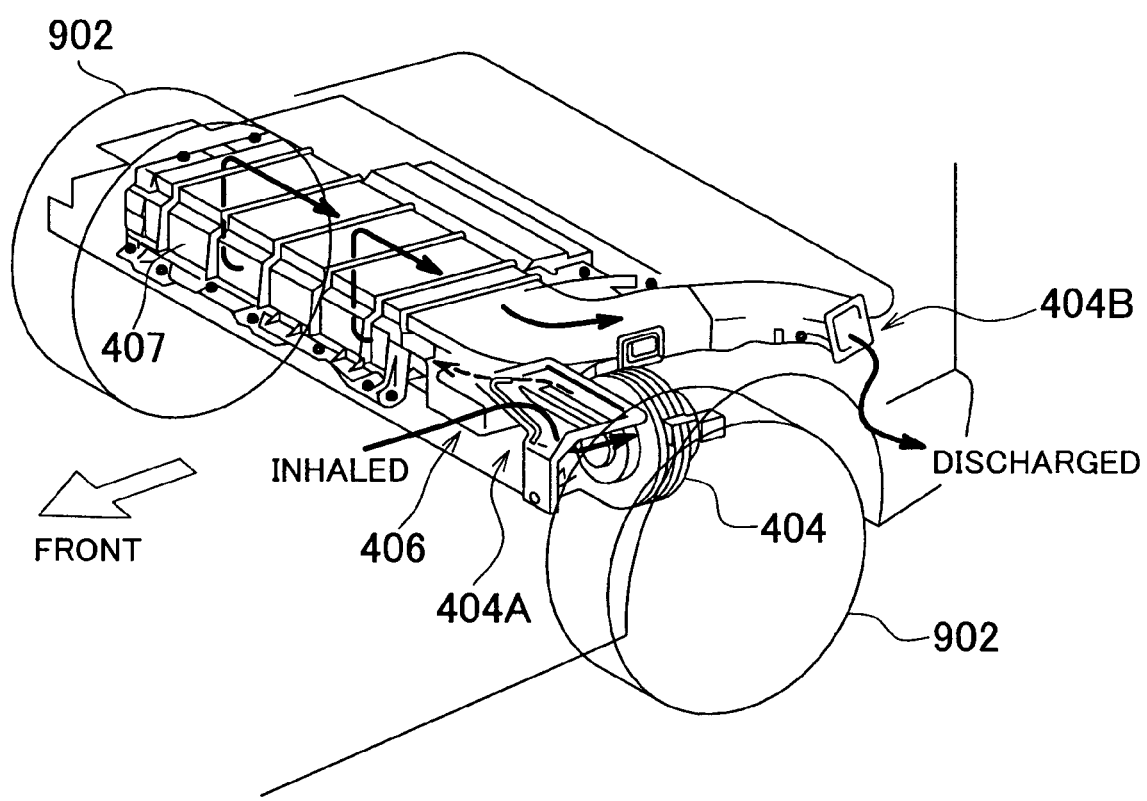
FIG. 2 is a perspective view showing a battery assy including a battery, fan, and battery ECU.

The battery 400, the fan 404, and the battery ECU 406 will be further explained with reference to FIG. 2. The battery 400, the fan 404, and the battery ECU 406 are all disposed in a battery case 407 and together installed as one battery assy to the vehicle. In the vehicle, this battery assy is located below an occupant seat, not shown, and lower than the floor of the vehicle. In operation, the fan 404 runs to introduce air into the battery case 407 through an air inlet 404A. The introduced air is then circulated throughout the battery case 407 for cooling the battery 400, and is discharged via an air outlet 404B. Upon installation of the battery assy (i.e., battery 400, fan 404, battery ECU 406, battery case 407) to the vehicle during an assembly or maintenance of the vehicle, it is handled with the battery ECU 406 unconnected to the accessory battery 1000. After installed to the vehicle, the battery ECU 406 is connected to the accessory battery 1000. Upon uninstallation of the battery assy from the vehicle, the battery ECU 406 is disconnected from the terminals of the accessory battery 1000 beforehand.

Thus, the battery assy including the battery 400, the fan 404, and the battery ECU 406 is located below the floor of the vehicle body in the vehicle. Therefore, they are not able to be seen from the outside of the vehicle, so it is impossible to visually check the electric connection of the fan 404.

FIG. 3 shows a command table stored in the memory 408 and referenced by the battery ECU 406 to set the operation voltage level (i.e., fan speed) of the fan 404. More specifically, the battery ECU 406 sets the operation voltage level by selecting an appropriate fan command value among 0 to 4. When the fan command value is 0, the fan 404 is not operated. When the fan command value is 1, the operation voltage of the fan 404 is set to a low voltage level. When the fan command value is 2, the fan operation voltage level is set to a middle voltage level which is higher than the low voltage level. When the fan command value is 3 or 4, the fan operation voltage level is set to a high voltage level which is higher than the middle voltage level. Although the command values 3 and 4 make no difference in the voltage applied to the fan 404, they are distinguished as different command values corresponding to different fan operation modes respectively, in order to enable execution of a program which will be described below.

Hereinafter, the operation of the fan system according to the first exemplary embodiment will be described with reference to FIG. 4.

Figure 4:
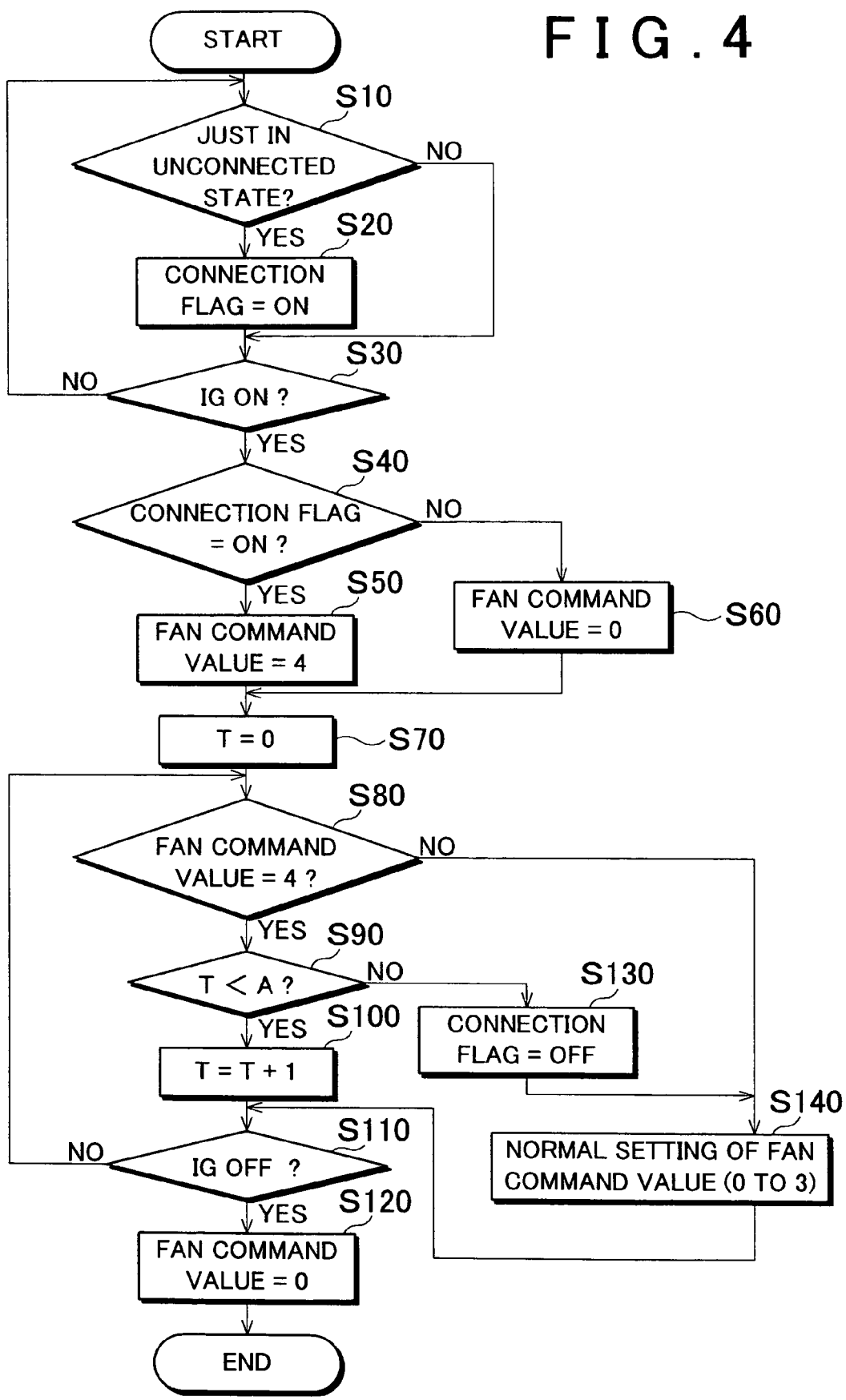
FIG. 4 is a flowchart showing a routine executed by the battery ECU.

Referring to FIG. 4, in S10, the battery ECU 406 refers to the reading of the counter 410 and determines whether the electric connection between the battery ECU 406 and the accessory battery 1000 was just in an unconnected state, i.e., a state in which the battery ECU 406 is not connected to the accessory battery 1000. In other words, at this time, the battery ECU 406 refers to the reading of the counter 410 as a record concerning the state of the electric connection between the battery ECU 406 and the accessory battery 1000, and the battery ECU 406 then determines based on that record whether the same electric connection state was just in an unconnected state. If so (YES in S10), the battery ECU 406 proceeds to S20. If not (NO in S10), it directly proceeds to S30 by skipping S20.

The battery ECU 406 sets a connection flag to ON in S20, and determines in S30 whether the ignition has been turned on. If the ignition has been turned on (YES in S30), it proceeds to S40. If not (NO in S30), it returns to S10.

In S40, the battery ECU 406 determines whether the connection flag is ON. If it is ON (YES in S40), the battery ECU 406 proceeds to S50. If not (NO in S40), it proceeds to S60.

In S50, the battery ECU 406 sets the fan command value to 4 so that the fan 404 start running at a corresponding fan speed.

In S60, on the other hand, the battery ECU 406 sets the fan command value to 0 and the fan 404 is therefore not operated. In either case, the battery ECU 406 proceeds to S70 and resets a count T to 0. The count T counts the number of times S80 and S90 are both executed.

Next, the battery ECU 406 determines in S80 whether the fan command value is 4. As evident from the above description, the fan command value is only set to 4 when it has been determined that the electric connection between the battery ECU 406 and the accessory battery 1000 was just in an unconnected state. Namely, by such identification of the fan command value, the battery ECU 406 is able to determine whether the present operation mode results from the fact that the above electric connection state was just in an unconnected state. If the fan command value is 4 (YES in S80), the battery ECU 406 proceeds to S90. If not (NO in S80), it proceeds to S140.

In S90, the battery ECU 406 determines whether the count T is smaller than a reference value A. This comparison is made to determine whether the operation mode corresponding to the fan command value "4" has been continuing longer than a predetermined period of time. If the count T is smaller than the reference value A (YES in S90), the battery ECU 406 proceeds to S100. If it is greater (NO in S90), the battery ECU 406 proceeds to S130.

The battery ECU 406 advances the count T by one in S100, and determines in S110 whether the ignition has been turned off. If the ignition has been turned off (YES in S110), the battery ECU 406 proceeds to S120 and sets the fan command value to 0 to stop the fan 404. If not (NO in S110), the battery ECU 406 returns to S80.

If NO in S90, the battery ECU 406 sets the connection flag to OFF in S130, and sets the fan command value to 1, 2, or 3 in accordance with the temperature of the battery 400 in S140. Here, the detail of this setting of the fan command value based on the battery temperature will be explained since a known setting method may be applied.

Below is described one exemplary case in which the battery ECU 406 controls the fan 404 according to the above routine.

Figure 5:
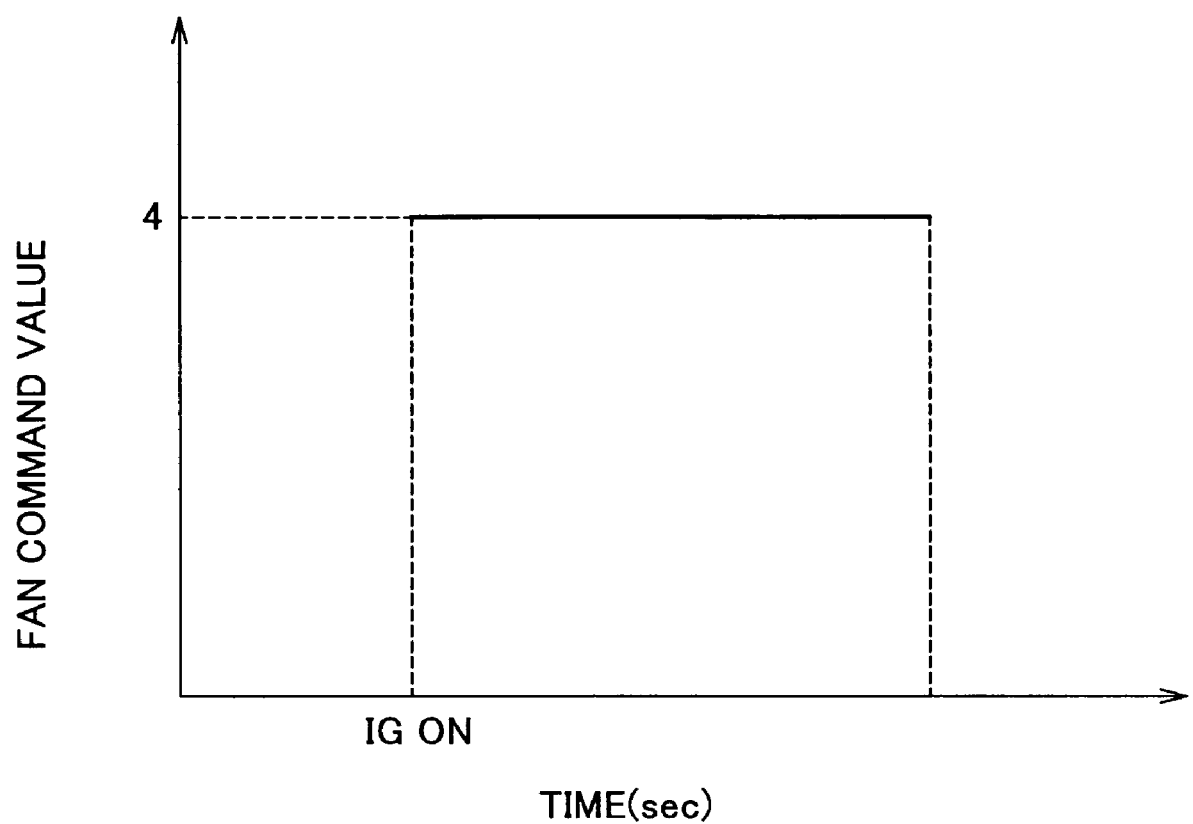
FIG. 5 is a timing chart illustrating the period of time for which the fan is operated.

First, the battery 400, the fan 404, and the battery ECU 406 are together installed to a hybrid vehicle as one battery assy with the battery ECU 406 being unconnected to the accessory battery 1000. After installed, the battery ECU 406 is then connected to the terminals of the accessory battery 1000 whereby the electric connection state of the battery ECU 406 shifts from an unconnected state to a connected state. At this time, the battery ECU 406 reads the counter 410. Since the counter 410 has been reset to 0, the battery ECU 406 judges that the electric connection between the battery ECU 406 and the accessory battery 1000 was just in an unconnected state (YES in S10), and sets the connection flag to ON (S20). If the ignition is turned on at this time, the battery ECU 406 detects it (YES in S30), and after confirming that the connection flag is ON (YES in S40), sets the fan command value to 4 (S50) so that the fan 404 starts running at a corresponding fan speed. After that, the count T is reset to 0 (S70) and starts to advance one count in each cycle. The count T keeps advancing as long as it is smaller than the reference value A (YES in S90). When the count T exceeds the reference value A (NO in S90), the connection flag is set to OFF (S130), and the normal fan speed control starts which sets the fan command value in accordance with the temperature of the battery 400 (S140). Thus, through a comparison between the count T and the reference value A, the battery ECU 406 controls the fan 404 to keep running at a fan speed corresponding to the fan command value "4" for a predetermined period of time as shown in FIG. 5. During this period, therefore, a worker is able to check the operation of the fan 404 by putting his or her hand close to the air outlet 404B. More specifically, by doing so, he or she is able to feel the flow of the cooling air and check the operation of the fan 404. If the fan 404 is running normally at this time, it indicates that there is no defect in the electric connection of the fan 404. Meanwhile, if the ignition is turned off, the battery ECU 406 detects it (YES in S110) and sets the fan command value to 0 to stop the fan 404 (S120).

Thus, in the first exemplary embodiment of the invention, the battery ECU 406 starts the fan 404 if it is determined that the electric connection between the battery ECU 406 and the accessory battery 1000 was just in an unconnected state. So a worker is able to check the operation of the fan and thus check if there is any defect in the electric connection of the fan even when the fan has already been installed in the vehicle and the same electric connection therefore can not be visually checked from the outside.

Next, a fan system according to a second exemplary embodiment of the invention will be described with reference to the accompanying drawings. The second embodiment fan system is different from the first embodiment fan system in that the battery ECU 406 starts the fan 404 when it is determined that the internal electric connection of the battery 400 was just in an unconnected state.

Figure 6:
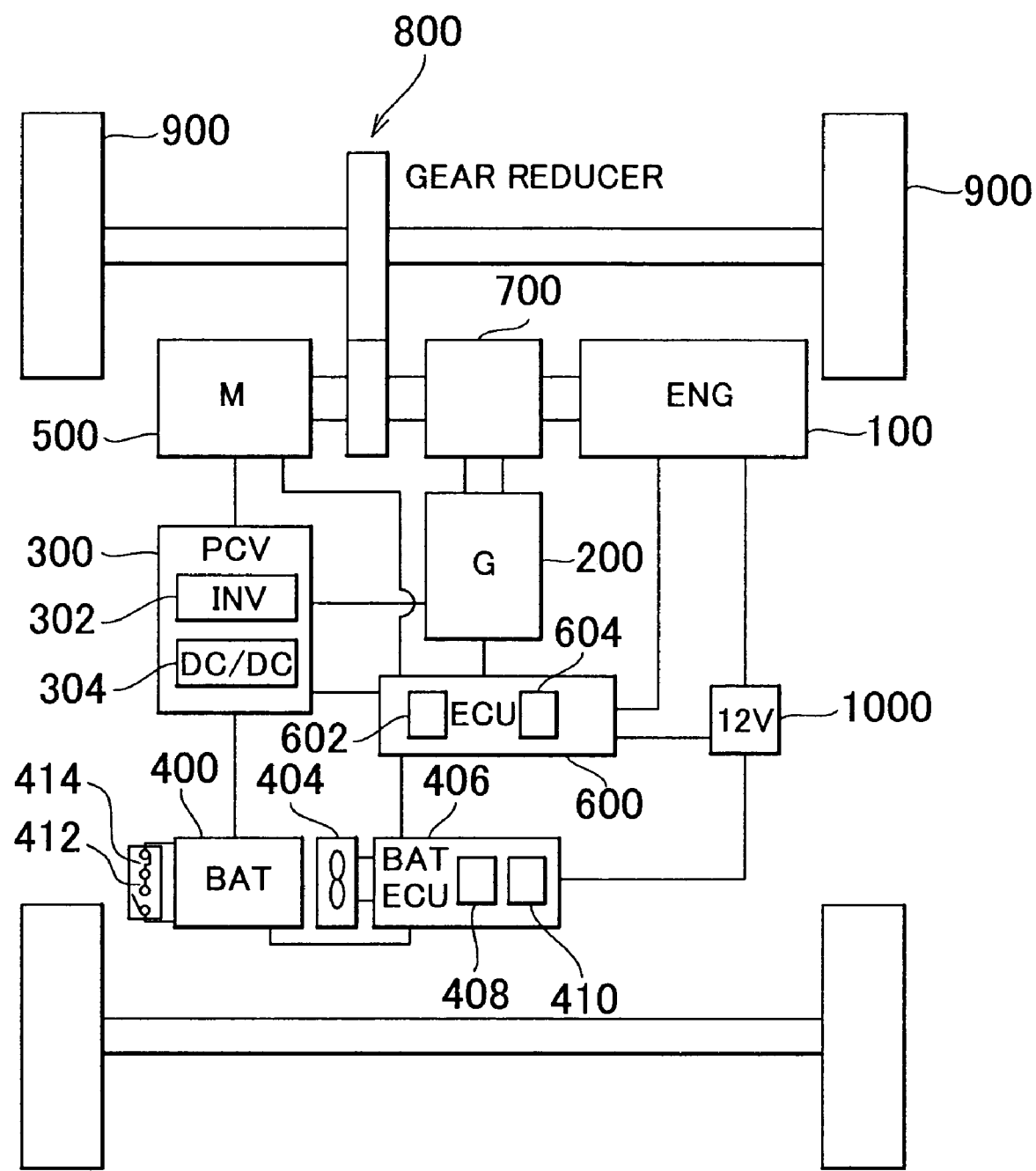
FIG. 6 is a view schematically showing the configuration of a hybrid vehicle incorporating a fan system according to another exemplary embodiment of the present invention.
Figure 7A:
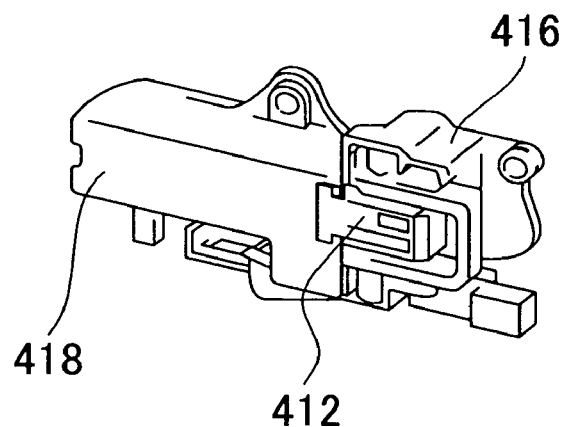
FIG. 7a and 7b are perspective views showing a service plug.
Figure 7B:
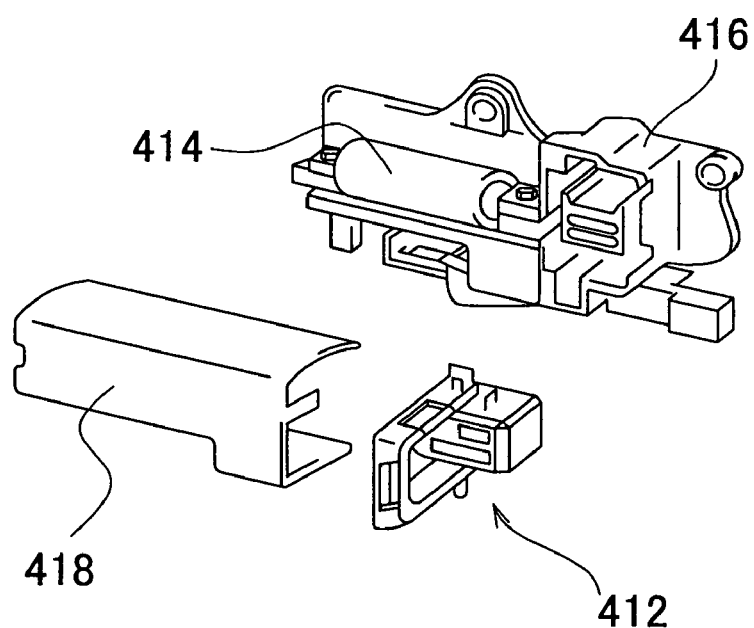

FIG. 6 is a view schematically showing the configuration of the fan system according to the second exemplary embodiment. Referring to FIG. 6, a service plug 412 and a fuse 414 are provided to the battery 400. As indicated in FIG. 7A, the fuse 414 is disposed on a socket 416 and covered by the cover 418, and the service plug 412 is plugged to the socket 416. With this arrangement, the internal electric connection of the battery 400 is in a connected state when the service plug 412 is plugged, whereas it is in an unconnected state when the service plug 412 is unplugged as shown in FIG. 7B.

The counter 410 of the battery ECU 406 counts, based on the voltage of the battery 400, the length of time the internal electric connection of the same battery 400 remains in a connected state. The counter 410 is reset to 0 in response to the internal electric connection of the battery 400 being shifted to an unconnected state. Thus, the battery ECU 406 determines based on the reading of the counter 410 whether the internal electric connection of the battery 400 was just in an unconnected state. If so, the battery ECU 406 sets the connection flag to ON (S20) and starts the fan 404 (S50).

Note that other structure elements and their functions are substantially the same as described in the first exemplary embodiment and their explanation will therefore be omitted here. By the way, the battery ECU 406 may be powered by the battery 400 instead of the accessory battery 1000.

As aforementioned, in the second exemplary embodiment of the invention, the fan system starts the fan if it is determined that the internal electric connection of the battery 400 was just in an unconnected state. Therefore a worker is able to check the operation of the fan and thus check if there is any defect in the electric connection of the fan even when the fan 404 has already been installed in the vehicle and the same electric connection therefore can not be visually checked from the outside.

With the foregoing structure, also, the internal connection of the battery 400 may be shifted between a connected state and an unconnected state by fitting or removing the service plug 412. A worker, therefore, is able to improve the safety in his work by unplugging the service plug 412 from the socket 416 and thus shutting off the battery power beforehand.

While the invention has been described with reference to preferred embodiments thereof, it is to be understood that the invention is not limited to the preferred embodiments or constructions. To the contrary, the invention is intended to cover various modifications and equivalent arrangements other than described above. In addition, while the various elements of the preferred embodiments are shown in various combinations and configurations, which are exemplary, other combinations and configurations, including more, less or only a single element, are also within the spirit and scope of the invention. For example, as well as a hybrid vehicle, the invention may be applied to a vehicle of other type, such as a fuel cell powered vehicle, electric vehicle. Also, the fan 404 may be controlled by the hybrid ECU 600 instead of the battery ECU 406.

What is claimed is:

1. A fan system for a vehicle, comprising:
   a fan;
   a fan controller being adapted to keep a record of a state of an internal connection of a power storage in the fan system, and start the fan in response to a predetermined condition regarding the state of the internal connection being satisfied;
   a plug provided in the power storage for powering the fan system to maintain the internal connection of the power storage in a connected state, the plug being removable from the power storage to place the internal connection of the power storage in an unconnected state; and
   wherein the fan is controlled based on the record of the state of the internal connection in the fan system and the predetermined condition is satisfied if the record indicates that the internal electric connection of the power storage was just in an unconnected state.

2. A fan system according to claim 1, wherein the fan controller is further adapted to control the fan to continue running for a predetermined period of time after started.

3. A fan system for a vehicle, comprising:
   a fan;
   a fan controller being adapted to detect a shift in a state of an internal connection of a power storage in the fan system from an unconnected to a connected state, and start the fan in response to a predetermined condition regarding the state of the internal connection being satisfied;
   a plug provided in the power storage for powering the fan system to maintain the internal connection of the power storage in the connected state, the plug being removable from the power storage to place the internal connection of the power storage in the unconnected state; and
   wherein the fan is controlled based on a record of the state of the internal connection in the fan system and the predetermined condition is satisfied if the record indicates that the internal electric connection of the power storage was just in the unconnected state.

4. A fan system according to claim 3, wherein the fan controller is further adapted to control the fan to continue running for a predetermined period of time after started.

5. A fan system for a vehicle, comprising:
   a fan;
   a fan controlling means which keeps a record of a state of an internal connection of a power storage in the fan system, and starts the fan in response to a predetermined condition regarding the state of the internal connection being satisfied;
   a plug provided in the power storage for powering the fan system to maintain the internal connection of the power storage in a connected state, the plug being removable from the power storage to place the internal connection of the power storage in an unconnected state; and
   wherein the fan is controlled based on the record of the state of the internal connection in the fan system and the predetermined condition is satisfied if the record indicates that the internal electric connection of the power storage was just in an unconnected state.

6. A fan system for a vehicle, comprising:
   a fan;
   a fan controlling means which detects a shift in a state of an internal connection of a power storage in the fan system from an unconnected state to a unconnected state, and start the fan in response to a predetermined condition regarding the state of the internal connection being satisfied;
   a plug provided in the power storage for powering the fan system to maintain the internal connection of the power storage in the connected state, the plug being removable from the power storage to place the internal connection of the power storage in an unconnected state; and
   wherein the fan is controlled based on the record of the state of the internal connection in the fan system and the predetermined condition is satisfied if the record indicates that the internal electric connection of the power storage was just in the unconnected state.

7. A method for controlling a fan system for a vehicle including a fan, comprising:
keeping a record of a state of an internal connection of a power storage in the fan system,
starting the fan in response to a predetermined condition regarding the state of the internal connection being satisfied;
providing a plug in the power storage for powering the fan system to maintain the internal connection of the power storage in a connected state, the plug being removable from the power storage to place the internal connection of the power storage in an unconnected state; and
wherein the fan is controlled based on the record of the state of the internal connection in the fan system and the predetermined condition is satisfied if the record indicates that the internal electric connection of the power storage was just in an unconnected state.

8. A method for controlling a fan system for a vehicle including a fan, comprising:
detecting a shift in a state of an internal connection of a power storage in the fan system from an unconnected state to a connected state,
starting the fan in response to a predetermined condition regarding the state of the internal connection being satisfied; and
providing a plug in the power storage for powering the fan system to maintain the internal connection of the power storage in the connected state, the plug being removable from the power storage to place the internal connection of the power storage in the unconnected state;
wherein the fan is controlled based on the record of the state of the internal connection in the fan system and the predetermined condition is satisfied if the record indicates that the internal electric connection of the power storage was just in the unconnected state.

9. A fan system for a vehicle, comprising:
a fan;
a fan controller being adapted to keep a record of a state of a predetermined electric connection in the fan system, and start the fan in response to a predetermined condition regarding the state of the predetermined electric connection being satisfied; and
wherein the fan is controlled based on the record of the state of the predetermined electric connection in the fan system, and
wherein the fan controller starts the fan when the fan controller is connected to a terminal of a power storage after the fan controller is disconnected from the terminal of the power storage.

10. A fan system for a vehicle, comprising:
a fan; and
a fan controller being adapted to detect a shift in a state of a predetermined electric connection in the fan system from a disconnected state to a connected state, and start the fan in response to a predetermined condition regarding the state of the predetermined electric connection being satisfied,
wherein the fan is controlled based on the record of the state of the predetermined electric connection in the fan system, and
wherein the fan controller starts the fan when the fan controller is connected to a terminal of a power storage after the fan controller is disconnected from the terminal of the power storage.

11. A fan system for a vehicle, comprising:
a fan;
fan controlling means which keeps a record of a state of a predetermined electric connection in the fan system, and starts the fan in response to a predetermined condition regarding the state of the predetermined electric connection being satisfied,
wherein the fan is controlled based on the record of the state of the predetermined electric connection in the fan system, and
wherein the fan controller starts the fan when the fan controller is connected to a terminal of a power storage after the fan controller is disconnected from the terminal of the power storage.

12. A fan system for a vehicle, comprising:
a fan;
fan controlling means which detects a shift in a state of a predetermined electric connection in the fan system from a disconnected state to a connected state, and starts the fan in response to a predetermined condition regarding the state of the predetermined electric connection being satisfied,
wherein the fan is controlled based on the record of the state of the predetermined electric connection in the fan system, and
wherein the fan controller starts the fan when the fan controller is connected to a terminal of a power storage after the fan controller is disconnected from the terminal of the power storage.

13. A method for controlling a fan system for a vehicle including a fan, comprising:
keeping a record of a state of a predetermined electric connection in the fan system,
starting the fan in response to a predetermined condition regarding the state of the predetermined electric connection being satisfied,
wherein the fan is controlled based on the record of the state of the predetermined electric connection in the fan system, and
wherein the fan controller starts the fan when the fan controller is connected to a terminal of a power storage after the fan controller is disconnected from the terminal of the power storage.

14. A method for controlling a fan system for a vehicle including a fan, comprising:
detecting a shift in a state of a predetermined electric connection in the fan system from a disconnected state to a connected state,
starting the fan in response to a predetermined condition regarding the state of the predetermined electric connection being satisfied,
wherein the fan is controlled based on the record of the state of the predetermined electric connection in the fan system, and
wherein the fan controller starts the fan when the fan controller is connected to a terminal of a power storage after the fan controller is disconnected from the terminal of the power storage.

* * * * *